United States Patent [19]

Glen

[11] Patent Number: 4,634,100

[45] Date of Patent: Jan. 6, 1987

[54] FENCE WIRE TIGHTENER

[76] Inventor: Bill Glen, Tennessee Valley Ranch, Pincher Creek, Alberta, Canada, T0K 1W0

[21] Appl. No.: 702,290

[22] Filed: Feb. 15, 1985

[30] Foreign Application Priority Data

Sep. 13, 1984 [CA] Canada ................................. 463117

[51] Int. Cl.$^4$ ....................... A44B 21/00; B25B 25/00
[52] U.S. Cl. ...................................... 254/213; 24/71.2
[58] Field of Search ....................... 254/213, 216, 222; 24/71.1, 71.2, 71.3; 242/100.1

[56] References Cited

U.S. PATENT DOCUMENTS

| 471,207 | 3/1892 | Andre | 24/71.2 X |
| 758,829 | 5/1904 | Dodd | 254/213 X |
| 1,044,551 | 11/1912 | Lynch | 24/71.2 X |
| 1,659,602 | 2/1928 | Jensen | 24/71.2 |
| 2,731,691 | 1/1959 | Flind | 24/71.2 |

FOREIGN PATENT DOCUMENTS 210519 4/1956 Australia ............................. 254/213

Primary Examiner—Stuart S. Levy
Assistant Examiner—Katherine Matecki
Attorney, Agent, or Firm—Harold H. Dutton, Jr.; George H. Dunsmuir

[57] ABSTRACT

A fence wire tightener includes an elongated body; a post on one end of the body extending outwardly in one direction perpendicular to the body, with a slot in the outer free end of the post for receiving a wire to be tightened; and a handle on the other end of the body extending outwardly therefrom in a direction opposite to the post and perpendicular to the body, whereby, when a wire is inserted into the slot the handle can be used to rotate the body and post around the axis of the post to wind the wire around the outer free end of the post.

1 Claim, 4 Drawing Figures

FENCE WIRE TIGHTENER

BACKGROUND OF THE INVENTION

This invention relates to a wire tightener, and in particular to a fence wire tightener.

There are literally thousands of fences in North America constructed using wooden posts and so-called chicken wire. The conventional method of tightening the strands of wire between posts is to use a screwdriver or crowbar in an attempt to twist the wire into a rough coil. Not only is such a method difficult to effect, but once coiled the wire displays a tendency to uncoil and go slack. Accordingly, there exists a need for a wire tightener which makes it relatively easy to tighten wire fences. Preferably the tightener incorporates some means for locking the coil, i.e. preventing unwinding of the coil and loosening of the fence wire.

The object of the present invention is to meet the above defined needs by providing a relatively simple fence wire tightener, which, according to one embodiment, is easy to operate, and which according to another embodiment incorporates a device for easy coil retention or locking.

BRIEF SUMMARY OF THE INVENTION

Accordingly, the present invention relates to a wire tightener comprising elongated body means; post means on one end of said body means extending outwardly in one direction perpendicular to said body means; slot means in the outer free end of said post means for engaging a wire to be tightened; and handle means on the other end of said body means extending outwardly therefrom in a direction opposite to said one direction and perpendicular to said body means, whereby, when a wire is inserted into said slot means said handle means, body means and post means can be rotated around the axis of said post means to wind said wire around said outer free end of said post means to tighten the wire.

BRIEF DESCRIPTION OF THE DRAWINGS

The invention will now be described in greater detail with reference to the accompanying drawing, which illustrates two preferred embodiments of the invention, and wherein.

DESCRIPTION OF THE PREFERRED EMBODIMENT(S)

Figure 1:
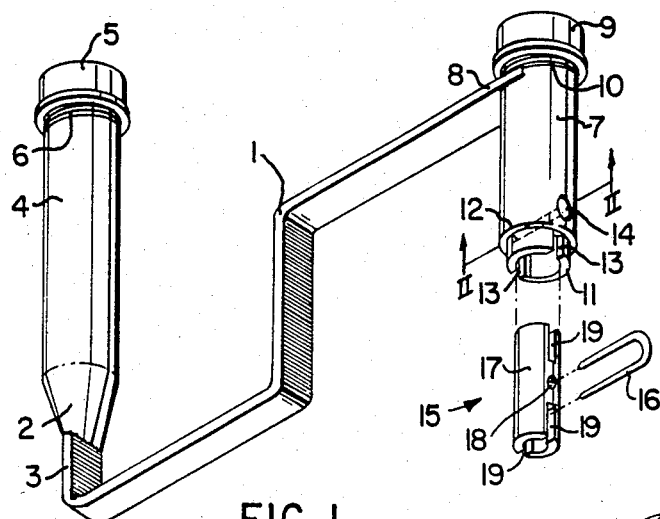
FIG. 1 is a perspective view from one end of a first embodiment of a wire tightener in accordance with the present invention.
Figure 2:
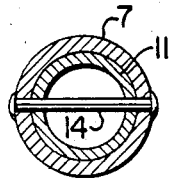
FIG. 2 is a cross section taken generally along line II—II of FIG. 1.

Referring to FIGS. 1 and 2, one embodiment of the wire tightener of the present invention includes an elongated stepped body 1 defined by a suitably bent strip of metal. The generally conical end 2 of a short section of pipe is secured to one end 3 of the body 1 to define a handle 4. The handle 4 is hollow for storage purposes. An internally threaded cap 5 is provided on the externally threaded top end 6 of the handle 4. A second pipe section 7 is provided at the outer end 8 of the body 1. An internally threaded cap 9 is provided on one end 10 of the pipe section 7. A short section of pipe 11 is secured in the other end 12 of the pipe section 7. One end of the pipe section 11 extends out of the pipe section 7, and diametrically opposed slots 13 are provided in such one end. A pin 14 extends through the pipe sections 7 and 11 a short distance above the bottom end 12 of the pipe section 7.

The tightener is intended for use with a lock device generally indicated at 15 (FIG. 1) and a fence staple 16 for locking the wire in a coiled condition. The lock device 15 includes a small diameter tubular body 17 with axial aligned holes 18 (one shown) at the middle thereof. Diametrically opposed slots 19 are provided in each end of the body 17. The pipe section 7 and the lock device 15 define a post for engaging a fence wire to be tightened.

In the second embodiment of the invention (FIG. 3), the body 21 is defined by a straight strip of metal. A pipe section 22 is connected to one end 23 of the body 21. The pipe section 22 extends above and below the body 21. A sleeve defining a handle 24 is mounted on the top end of the pipe section 22. The internal diameter of the handle 24 is larger than the external diameter of the pipe section 22, so that the handle 24 can rotate on the pipe section. A cap 26 is provided on the top end of the pipe section 22. A sleeve 27 is also provided on the lower end of the pipe section 22, and an arcuate washer 28 partially closes the bottom end of the pipe section 22. A solid cylindrical wire engaging post 30 is provided at the other end 31 of the body 21. The bottom end of the post 30 includes a frusto-conical shoulder 32, and a reduced diameter bottom end 33. A slot 34 is provided in the bottom end 33 of the post 30.

Figure 4:
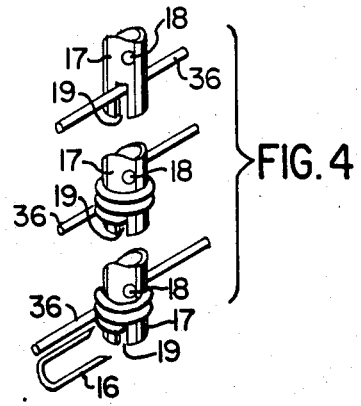
FIG. 4 is a series of schematic perspective views of one end of the tightener of FIGS. 1 and 2 showing the operation of the tightener.

The use of the device of the present invention will be described first with reference to FIG. 4. The tubular body 17 is placed in the open end of the pipe section 7 so that the pin 14 is received in the slots 19 at one end of the body 17. Thus, when the body 1 and the handle 4 are rotated around the longitudinal axes of the pipe section 7 and the body 17, the pipe section 7 and the body 17 rotate as a unit. The wire 36 is wound around the body 17 by continued rotation of the handle 4 and the body 1 around the axes of the pipe section 7 and the body 17. Once the desired tension has been achieved, a fence staple 16 (normally stored in the handle 4 or pipe section 7) is inserted into the body 17 so that one arm enters a hole 18 and the other arm enters a slot 19 surrounding the coils of wire 36 on the body 17. The handle 4, body 1 and pipe section 7 are removed, and the body 17 is left in position. Such bodies 17 are relatively inexpensive to produce.

Figure 3:
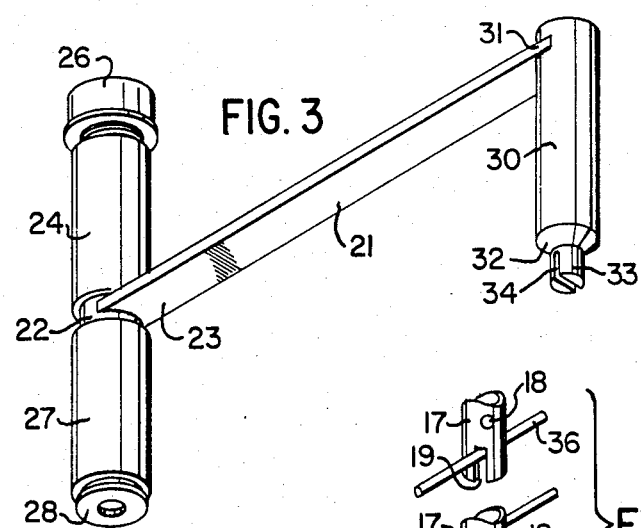
FIG. 3 is a perspective view of a second embodiment of a wire tightener in accordance with the present invention.

Alternatively, when using the tightener of FIG. 3, the wire is inserted into the slot 34 in the post 30, and the pipe section 22, handle 24, body 21 and the post 30 are rotated around the longitudinal axis of the post 30 to wind the wire on the end 33 of the post. When the desired tension has been achieved, the end 33 of the post 30 is removed from the wire coil, and one arm of a staple 16 is inserted into the coil to limit unwinding thereof.

What I claim is:

1. A fence wire tightener comprising an elongated handle body having a handle at one end and a hollow tubular post member at the other end thereof, said post member extending generally perpendicularly from said body and having a diametrically arranged pin extending through said post member near the distal end thereof, a wire engaging element removably insertable in the distal end of said post member and comprising a generally cylindrial tightening member having a slot formed in each end thereof and a central transverse passageway formed therein, the slot in one end of said tightening member being adapted to engage said pin in said post member when said wire tighening member is inserted in said post member and the slot in the other end of said body being adapted to receive a fence wire therein, whereby rotation of said handle body about said post member causes a fence wire to be wound about said tightening member and whereupon a staple member may be inserted into said passageway for retaining the fence wire around said tightening member after said tightening member is removed from said post member.

* * * * *